US009771810B2

(12) United States Patent
Marchal et al.

(10) Patent No.: US 9,771,810 B2
(45) Date of Patent: Sep. 26, 2017

(54) FIBER PREFORM FOR A TURBINE ENGINE BLADE MADE OF COMPOSITE MATERIAL AND HAVING AN INTEGRATED PLATFORM, AND A METHOD OF MAKING IT

(71) Applicant: SNECMA, Paris (FR)

(72) Inventors: Yann Marchal, Melun (FR); Dominique Coupe, Le Haillan (FR); Jean-Noel Mahieu, Paris (FR); Bruno Jacques Gerard Dambrine, Le Chatelet en Brie (FR)

(73) Assignee: SNECMA, Paris (FR)

( * ) Notice: Subject to any disclaimer, the term of this patent is extended or adjusted under 35 U.S.C. 154(b) by 567 days.

(21) Appl. No.: 14/371,220

(22) PCT Filed: Jan. 7, 2013

(86) PCT No.: PCT/FR2013/050026
§ 371 (c)(1),
(2) Date: Jul. 9, 2014

(87) PCT Pub. No.: WO2013/104852
PCT Pub. Date: Jul. 18, 2013

(65) Prior Publication Data
US 2014/0369848 A1 Dec. 18, 2014

Related U.S. Application Data

(60) Provisional application No. 61/584,406, filed on Jan. 9, 2012.

(51) Int. Cl.
*F01D 5/28* (2006.01)
*D03D 1/00* (2006.01)
(Continued)

(52) U.S. Cl.
CPC .............. *F01D 5/282* (2013.01); *B29B 11/16* (2013.01); *B29C 70/24* (2013.01);
(Continued)

(58) Field of Classification Search
CPC ........... F01D 5/282; F01D 5/147; D03D 1/00; D03D 3/00; D03D 2700/01; D03D 25/005;
(Continued)

(56) References Cited

U.S. PATENT DOCUMENTS 6,874,543 B2 * 4/2005 Schmidt .................. B29C 70/24
139/383 R
2010/0105269 A1 * 4/2010 Goering .................. B29C 70/24
442/205
(Continued)

FOREIGN PATENT DOCUMENTS

| FR | WO 2010061140 A1 * | 6/2010 | ........... B29C 70/222 |
| FR | 2 943 942 | 10/2010 | |
| FR | 2 953 885 | 6/2011 | |

OTHER PUBLICATIONS

International Search Report Issued Nov. 20, 2013 in PCT/FR13/050026 filed Jan. 7, 2013.

*Primary Examiner* — Kenneth Bomberg
*Assistant Examiner* — Jesse Prager
(74) *Attorney, Agent, or Firm* — Oblon, McClelland, Maier & Neustadt, L.L.P.

(57) ABSTRACT

A method of making a fiber preform, and the preform, for fabricating a turbine engine blade out of composite material, the method including: making a single-piece fiber blank by three-dimensional weaving with layers of longitudinal yarns interlinked by yarns of layers of transverse yarns; and shaping the fiber blank to obtain a single-piece fiber preform including a portion forming an airfoil preform and at least one portion forming a platform preform. During weaving,
(Continued)

yarns of a first group of longitudinal yarns are extracted from the fiber blank beside one of side faces of the blank to form a portion corresponding to a blade platform preform, and yarns of a second group of longitudinal yarns are inserted into the fiber blank with mutual crossing of the yarns of the first group and the yarns of the second group.

14 Claims, 3 Drawing Sheets

(51) Int. Cl.
| | | |
|---|---|---|
| *D03D 3/00* | (2006.01) | |
| *B29C 70/24* | (2006.01) | |
| *D03D 25/00* | (2006.01) | |
| *B29D 99/00* | (2010.01) | |
| *B29B 11/16* | (2006.01) | |
| *B29L 31/08* | (2006.01) | |

(52) U.S. Cl.
CPC ........... *B29D 99/0025* (2013.01); *D03D 1/00* (2013.01); *D03D 3/00* (2013.01); *D03D 25/005* (2013.01); *B29L 2031/082* (2013.01); *D03D 2700/01* (2013.01); *F05D 2300/603* (2013.01); *F05D 2300/6034* (2013.01)

(58) Field of Classification Search
CPC ....... F05D 2300/603; F05D 2300/6034; F05D 2300/6012; B29L 2031/082; B29D 99/0025; B29C 70/24; B29B 11/16; Y10T 29/49337; Y02T 50/672
See application file for complete search history.

(56) References Cited

U.S. PATENT DOCUMENTS

| | | | |
|---|---|---|---|
| 2011/0277869 A1* | 11/2011 | Coupe | D03D 25/005 139/11 |
| 2011/0311368 A1* | 12/2011 | Coupe | B29C 70/222 416/241 A |
| 2012/0055609 A1 | 3/2012 | Blanchard et al. | |
| 2012/0099982 A1* | 4/2012 | Coupe | C04B 35/524 415/200 |
| 2013/0089429 A1 | 4/2013 | Nunez et al. | |
| 2014/0349538 A1* | 11/2014 | Marchal | B29C 70/24 442/206 |

* cited by examiner

FIBER PREFORM FOR A TURBINE ENGINE BLADE MADE OF COMPOSITE MATERIAL AND HAVING AN INTEGRATED PLATFORM, AND A METHOD OF MAKING IT

BACKGROUND OF THE INVENTION

The present invention relates to making a blade fiber preform having at least one platform, in particular for fabricating a turbine engine blade out of composite material.

Proposals have already been made to make blades out of composite material for turbine engines. By way of example, reference may be made to document EP 1 526 285, which describes fabricating a fan blade by making a fiber preform by three-dimensional weaving and densifying the preform with an organic matrix.

Furthermore, a turbine engine fan includes platforms that are arranged between the blades in order to define the inside of the annular air inlet passage into the fan, this passage being defined on the outside by a casing. These platforms may be added separately or they may be incorporated directly with the bases of the fan blades, between their airfoils and the tangs that extend their roots. The invention relates more particularly to blades forming part of the second category, i.e. blades having one or more platforms integrated therewith.

OBJECT AND SUMMARY OF THE INVENTION

It is therefore desirable to have turbine engine blades with one or more integrated platforms and made out of composite material, in particular, but not exclusively, out of organic matrix composite (OMC) material.

To this end, the invention proposes a method of making a fiber preform for fabricating a turbine engine blade out of composite material, the blade having an airfoil extending in a longitudinal direction and presenting two opposite side faces and at least one platform extending from a side face, the method comprising:
  making a single-piece fiber blank by three-dimensional weaving with a plurality of longitudinal yarns extending in a direction corresponding to the longitudinal direction of the blade that is to be fabricated and interlinked by yarns of a plurality of transverse layers of yarns;
  shaping the fiber blank to obtain a single-piece fiber preform having a first portion forming an airfoil preform and at least one second portion forming a platform preform; and
  during the weaving of the fiber blank, extracting yarns of a first group of longitudinal yarns from the fiber blank beside at least one of the side faces of the fiber blank in order to form a portion of the blank corresponding to a blade platform preform, and inserting yarns of a second group of longitudinal yarns into the fiber blank with mutual crossing between the yarns of the first group and the yarns of the second group.

During weaving, by crossing yarns extracted from the fiber blank with yarns inserted into the fiber blank, it is possible to obtain a single-piece fiber preform by three-dimensional weaving with both a portion that forms the airfoil preform and another portion that forms the platform preform, while maintaining fiber density within the fiber blank that is constant in spite of extracting the yarns of the first group.

This also ensures fiber continuity between the portion of the preform that forms the airfoil and the portion of the preform that forms the platform, thereby making it possible to impart the mechanical properties that are required for a blade having an integrated platform.

According to a feature of the method, the crossing between the yarns of the first group and the yarns of the second group takes place close to a connection between the portion of the blank corresponding to the blade platform preform and the portion of the blank corresponding to the airfoil preform.

Preferably, the yarns of the second group of yarns that are inserted into the fiber blank come from layers of longitudinal yarn previously extracted from the fiber blank in order to obtain a reduction in the thickness of the blank over its width. Layers of yarns may be extracted from the blank in order to take account of the reduction in the thickness of the profile of the airfoil (going from the root towards the tip of the blade). Using them to make the platform is therefore particularly advantageous since this avoids wasting them.

Under such circumstances, the shaping of the fiber blank advantageously includes cutting away the portion of the yarns of the second group of yarns that are situated between the zones where they are extracted from and inserted into the fiber blank. Furthermore, at least some of the yarns of the second group of yarns may be extracted from the fiber blank downstream from the zone where they are inserted into said fiber blank in order to reduce the thickness of the blank over its width downstream from the portion of the blank that corresponds to the blade platform preform.

When the profile of the airfoil of the blade does not present any thickness reduction between the root and the tip of the blade, or when such reduction in thickness does not enable a large enough quantity of yarns to be made available for forming the blade platform, at least some of the yarns of the second group of yarns that may be inserted into the fiber blank may come from additional layers of longitudinal yarns.

According to another feature of the method, the yarns are extracted from and inserted into the fiber blank on each of the side faces of the fiber blank in order to form portions of the blank that correspond to two blade platform preforms. Under such circumstances, the blade that is fabricated therefrom presents two platforms, one on either side (pressure side and suction side).

According to yet another feature of the method, the shaping of the fiber blank includes cutting the portion of the blank that corresponds to the blade platform preform to have the desired dimensions, and deploying said portion of the blank in a direction that is substantially orthogonal to its side face.

The longitudinal yarns extending in a direction corresponding to the longitudinal direction of the blade that is to be fabricated may be warp yarns. Alternatively, the longitudinal yarns extending in a direction corresponding to the longitudinal direction of the blade that is to be fabricated may be weft yarns.

The invention also provides a fiber preform for a turbine engine blade having an airfoil extending in a longitudinal direction and presenting two opposite side faces together with at least one platform extending from a side face, the preform comprising a fiber blank woven as a single piece by three-dimensional weaving with a plurality of layers of longitudinal yarns extending in a direction corresponding to the longitudinal direction of the blade that is to be fabricated and interlinked by yarns of a plurality of layers of transverse yarns, wherein, in accordance with the invention, yarns of a first group of longitudinal yarns are extracted from the fiber blank beside at least one of the side faces of the fiber blank in order to form a portion of the blank corresponding to a blade platform preform, and yarns of a second group of longitudinal yarns are inserted into the fiber blank, with mutual crossing between the yarns of the first group and of the second group.

The invention also provides a turbine engine fan blade made of composite material and comprising a fiber preform as defined above that has been densified with a matrix. The invention also provides a turbine engine fan that includes at least one such blade.

BRIEF DESCRIPTION OF THE DRAWINGS

Other characteristics and advantages of the present invention appear from the following description given with reference to the accompanying drawings that show an implementation having no limiting character. In the figures.

DETAILED DESCRIPTION OF THE INVENTION

Figure 1:
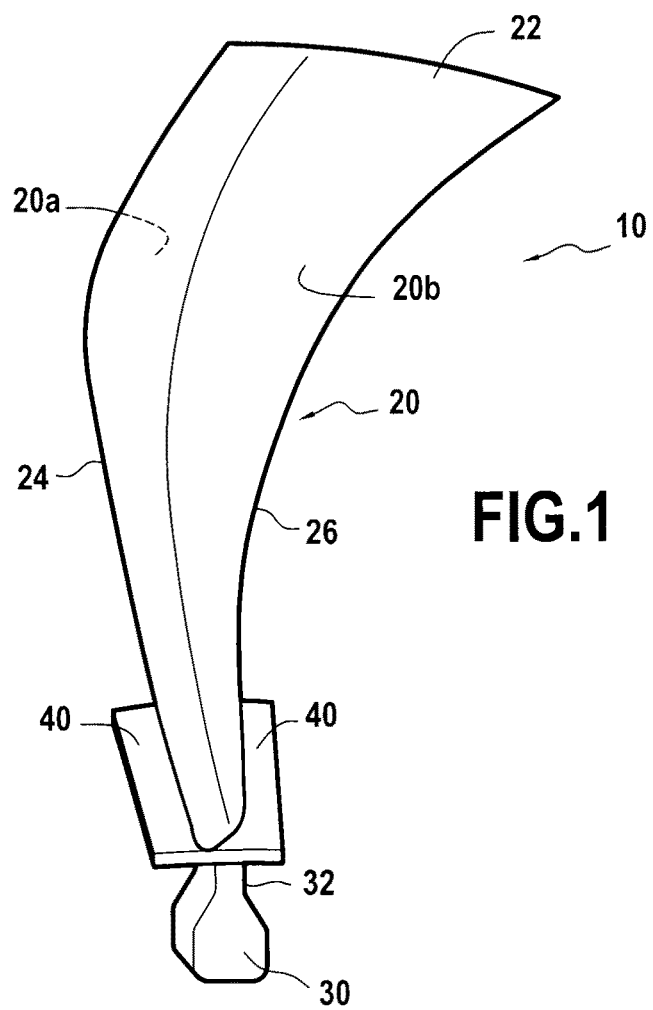
FIG. 1 is a perspective view of a turbine engine fan blade having two platforms integrated therewith.

The invention is applicable to fabricating any turbine engine blade having integrated platform(s) out of composite material, and it applies particularly but not exclusively to fan blades such as the blade shown in FIG. 1.

In well-known manner, the blade 10 of FIG. 1 comprises an airfoil 20, a root 30 formed by a portion of greater thickness, e.g. having a section that is bulb-shaped, extended by a tang 32, and two platforms 40 situated between the tang 32 and the airfoil 20.

The airfoil 20 extends in a longitudinal direction between the platforms 40 and the tip 22 of the blade, and it presents a curved profile in cross-section of thickness that varies between its two opposite side faces (i.e. its leading edge 24 and its trailing edge 26).

At its inner radial end, the blade 20 is connected to the platforms 40 via outside faces thereof that serve to define the inside of the annular inlet passage for admitting air into the fan, this passage being defined on the outside by a casing (not shown).

In the example of FIG. 1, the blade 10 thus has two platforms 40 that extend from the side faces (its pressure side face 20a and its suction side face 20b) of the blade 20. Naturally, the invention also applies to blades that have only one platform (e.g. extending from the suction side face of the blade, with the pressure side face then not having a platform).

Figure 2:
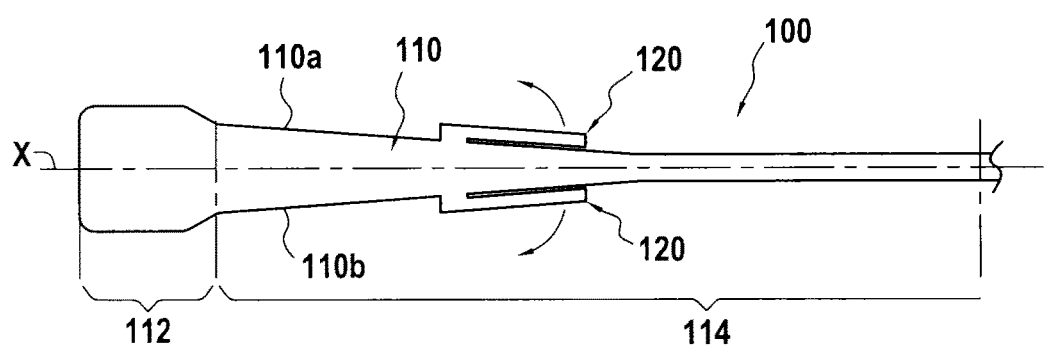
FIG. 2 is a very diagrammatic view of the arrangement of the layers of yarns in a 3D woven fiber blank for making a fan blade such as that shown in FIG. 1.

FIG. 2 shows the arrangement of the layers of yarns in a 3D woven fiber blank 100 for use in making a fan blade such as that shown in FIG. 1.

The fiber blank 100 comprises a central portion 110 that forms a preform for the airfoil and for the root, and two side portions 120 that, after shaping, are to form platform preforms. These portions 110 and 120 of the blank extend generally in the direction X corresponding to the longitudinal direction of the blade that is to be made. In this figure, only the envelopes of these two portions are shown. The central portion 110 has two opposite side faces 110a and 110b from which the two side portions 120 extend. When making a fan blade having a single platform, then only one of these side portions is present.

In its portion 112 that is to form a root preform, the central portion 110 presents extra thickness (between the side faces 110a and 110b) that is determined as a function of the thickness of the root of the blade that is to be made. In its portion 114 that is to form an airfoil preform, the central portion 110 presents varying thickness that is determined as a function of the thickness of the profile of the airfoil of the blade that is to be made.

Put briefly, a fiber preform having a shape close to the shape of the fan blade that is to be made can be obtained from such a fiber blank 100 as follows. After quality control, the fiber blank 100 is cut out flat so that all of the extra lengths are eliminated from the weaving and so that the part presents dimensions that match the injection mold. The cutting-out step applies in particular to the portion 112 of the blank that is to form a root preform, to the leading edge, the trailing edge, and the tip of the central portion 110 forming a blade preform, and to the ends of the side portions 120 that are to form the platform preforms.

Once cutting has been completed, the blank is shaped by laying it out flat and lifting one of the side portions so that it extends at 90° relative to the corresponding side face of the central portion. This position is blocked and the preform is turned over. The central portion of the blank is then deformed to reproduce the curved profile of the blade. Thereafter, the side portion is deployed at 90° relative to the corresponding side face of the central portion. This produces a single-piece fiber preform with one portion forming a preform for an airfoil and a root and two portions forming preforms for platforms. The resulting fiber preform is then dried and put into place in the injection mold.

The matrix is deposited in the fiber preform by keeping the preform in the mold at least until the preform has stiffened (or consolidated). The matrix is of a nature that is selected as a function of the intended application, e.g. an organic matrix obtained in particular from a resin that is a precursor of a polymer matrix, such as an epoxy, bismaleimide, or polyimide resin, or a carbon matrix, or a ceramic matrix. For an organic matrix, the fiber preform is impregnated with a composition containing the matrix precursor resin, prior to being shaped in tooling, or after being shaped, impregnation then being performed for example by infusion or by a resin transfer molding (RTM) type process. With a carbon matrix or a ceramic matrix, densification may be performed by chemical vapor infiltration (CVI) or by impregnation with a liquid composition containing a resin that is a precursor for carbon or for ceramic, and then applying pyrolysis or ceramization heat treatment to the precursor, these methods themselves being well known.

Ways in which the fiber blank 100 can be woven three-dimensionally are described in detail below.

It is assumed that the weaving is performed with warp yarns that extend in the longitudinal direction X of the blank, it being understood that it is also possible for weaving to be performed with weft yarns extending in this direction.

Figure 3:
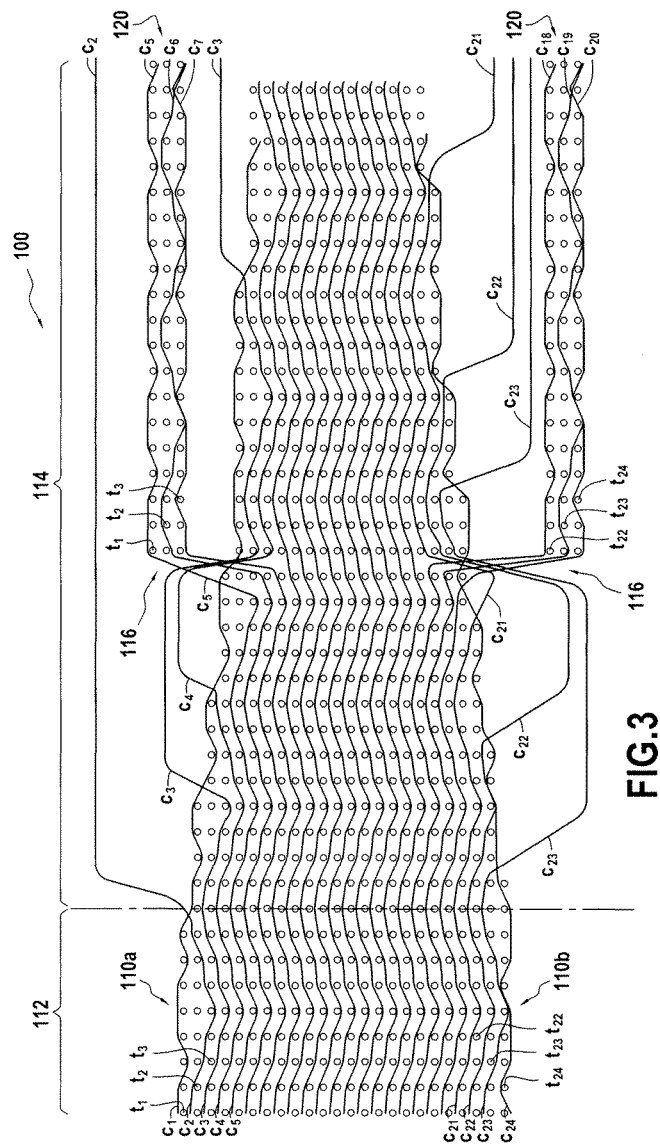
FIG. 3 is a diagrammatic view of a warp plane showing one way of weaving the FIG. 2 fiber blank.

FIG. 3 is a warp plane of a three-dimensional fiber blank 100 for use in making a fiber preform such as that shown in FIG. 2. The term "warp" plane is used herein to designate a plane in the fiber blank that extends perpendicularly to the weft yarns and that contains a column of warp yarns (in FIG. 2, continuous lines represent warp yarns).

By way of example, in a portion 112 that is to form a root preform, the fiber blank may comprise, between its opposite side faces 110a and 110b, 24 layers of warp yarns $c_1$ to $c_{24}$ and as many layers of weft yarns $t_1$ to $t_{24}$. In this portion 112, the weave is of the interlock type with a satin type weave for the warp yarns $c_1$ and $c_{24}$ in the portions adjacent to the opposite side faces 110a and 110b. 3D weaving of a fiber structure with an interlock type weave in its core and a 2D or 3D satin type weave in its skin is itself known. Reference may be made to document WO 2006/136755.

In the portion 114 that is to form an airfoil preform, the thickness of the fiber blank between its side faces 110a and 110b varies. Thus, in order to take account of this thinning of the profile of the blade that is to be fabricated, layers of warp yarns and a corresponding number of weft yarns are withdrawn progressively from the fiber blank. In the example of FIG. 3, it is the warp yarns $c_2$, $c_3$, and $c_4$ that are successively withdrawn from beside the side face 110a, and warp yarns $c_{23}$, $c_{22}$, and $c_{21}$ that are successively withdrawn from beside the opposite side face 110b. This manipulation that consists in withdrawing yarns that are being woven in the weaving of the fiber blank is itself known. Reference may be made to document EP 1 528 285.

In a zone 116 of the portion 114 of the fiber blank there are woven the side portions 120 that are to form platform preforms. For this purpose, layers of warp yarns are withdrawn from the fiber blank beside each of its side faces and they are woven with certain layers of weft yarns. In the example of FIG. 3, it is thus adjacent warp yarns $c_5$ to $c_7$, that are withdrawn from beside the side face 110a and woven with weft yarns $t_1$ to $t_3$ to form one of the side portions 120. Similarly, the adjacent warp yarns $c_{18}$ to $c_{20}$ are withdrawn beside the other side face 110b and they are woven with weft yarns $t_{22}$ to $t_{24}$ to form the other one of the side portions 120. Zones of non-interlinking are arranged between the layers of the warp yarns forming the portions 120 and the layers of warp yarns of the portion 114 that is to form an airfoil preform.

Furthermore, in order to maintain a constant fiber density in the fiber blank in spite of these warp yarns being withdrawn to form the side portions 120, at least some of the warp yarns that are withdrawn from the fiber blank for tapering the thickness of the profile of the blades are inserted into the portion 114 of the fiber blank in the zone 116 (here the warp yarns $c_3$ and $c_4$ beside the side face 110a and $c_{21}$, $c_{22}$, $c_{23}$ beside the side face 110b). Thus, these warp yarns cross the warp yarns $c_5$ to $c_7$ (beside the side face 110a) and $c_{18}$ to $c_{20}$ (beside the side face 110b), preferably at the connections between the portion 114 corresponding to the airfoil preform and the side portions 120 correspond to the platform preforms.

As a result, the warp yarns $c_3$ and $c_4$ beside the side face 110a and $c_{21}$, $c_{22}$, and $c_{23}$ beside the side face 110b are floated (i.e. they remain at the surface of the fiber blank without being interlinked with the weft yarns) between the zone where they exit the portion 114 of the fiber blank and the zone 116 where they are reinserted. If so required by the tapering thickness of the airfoil profile, at least some of these warp yarns may be extracted once more further downstream in the portion 114 of the fiber blank. For example, in FIG. 3, this applies to the warp yarns $c_3$, $c_{21}$, $c_{22}$, and $c_{23}$. In the subsequent step of shaping the fiber blank, the portions of these warp yarns $c_3$, $c_{21}$, $c_{22}$, and $c_{23}$ that are situated between their exits from and their insertions into the fiber blank are cut away.

FIG. 3 shows an implementation of crossing between the warp yarns reinserted into the portion 114 of the fiber blank in the zone 116 and the warp yarns extracted therefrom in order to weave the side portions 120 that are to form the platform preforms. Naturally, other known types of crossing could be used, in particular so as to avoid crossing that is too sudden.

Figure 4:
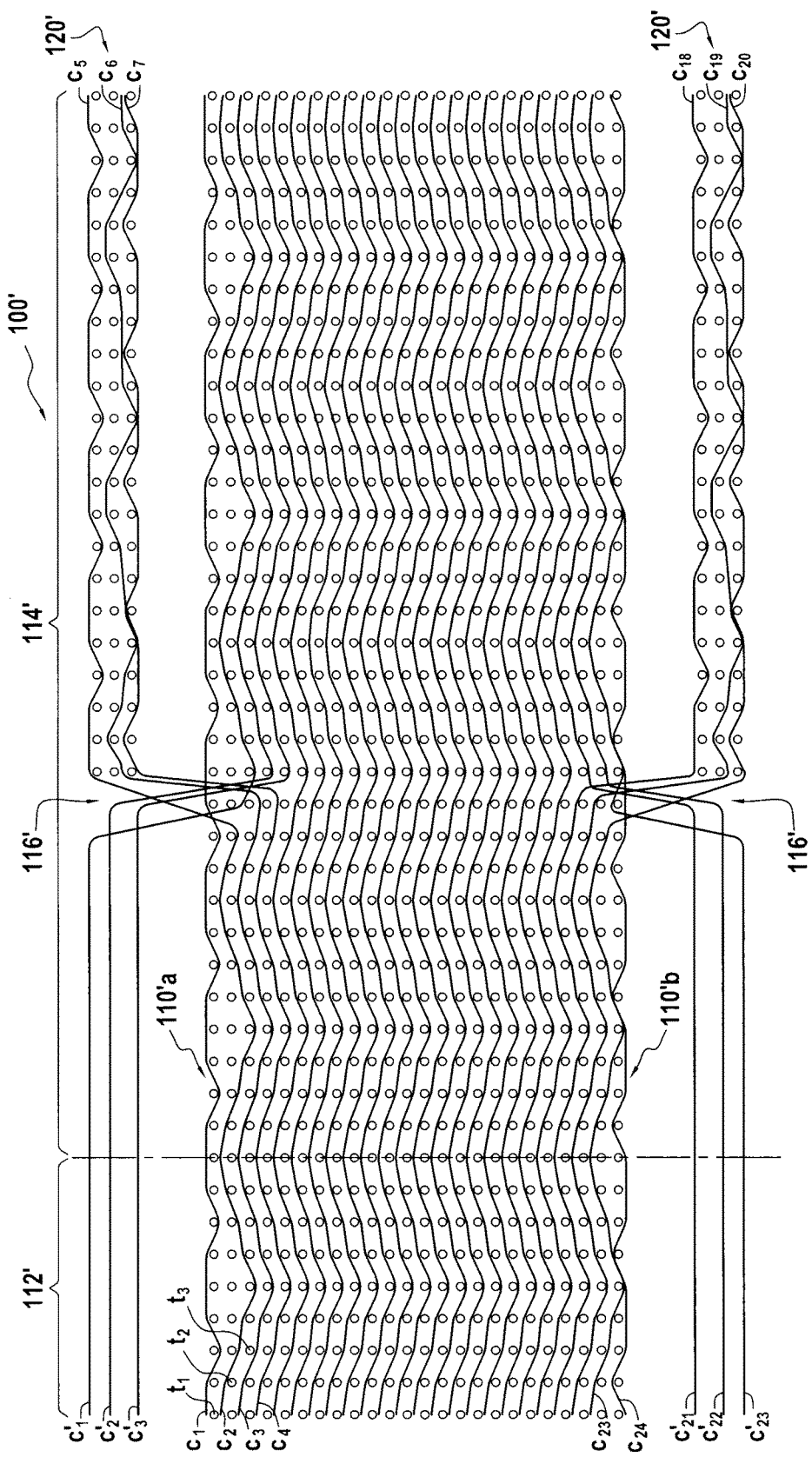
FIG. 4 is a diagrammatic view of a warp plane showing another way of weaving the fiber blank in a variant implementation of the invention.

FIG. 4 shows a weft plane of a fiber blank 100' for making a fiber blank for a turbine engine fan blade while weaving in a different way.

In this implementation, the profile of the airfoil of the blade that is to be made does not taper in its thickness, at least in the bottom portion of the blade going away from the platforms (i.e. thickness remains constant).

In its portion 112' that is to form a root preform, and between its opposite side faces 110a' and 110b', the fiber blank 100' comprises 24 layers of warp yarns $c_1$ to $c_{24}$ and as many layers of weft yarns $t_1$ to $t_{24}$. In this portion 112', the weave is of the interlock type with a satin type weave for the warp yarns $c_1$ and $c_{24}$ in the portions adjacent to the opposite side faces.

In the portion 114' that is to form an airfoil preform, the thickness of the fiber blank between its side faces 110'a and 110'b remains constant, such that no layer of yarns is extracted.

As in the above-described implementation, in a zone 116' of the portion 114' of the fiber blank, there are woven the side portions 120' that are to form the platform preform. For this purpose, in the example of FIG. 4, adjacent warp yarns $c_5$ to $c_7$ are withdrawn from beside the side face 110'a and woven with weft yarns $t_1$ to $t_3$ in order to form one of the side portions 120'. Likewise, adjacent warp yarns $c_{18}$ to $c_{20}$ are withdrawn beside the other side face 110'b and they are woven with weft yarns $t_{22}$ to $t_{24}$ in order to form the other one of the side portions 120'.

In order to maintain a constant fiber density in the fiber blank in spite of withdrawing these warp yarns that are to form the side portions 120', additional warp yarns $c'_1$ to $c'_3$ and $c'_{21}$ to $c'_{23}$ are introduced into the portion 114' of the fiber blank in the zone 116'. Thus, these warp yarns cross the warp yarns $c_5$ to $c_7$ (beside the side face 110') and $c_{18}$ to $c_{20}$ (beside the side face 110'b), preferably where the portion 114' corresponding to the airfoil preform is connected to the side portions 120' corresponding to the platform preforms.

It is possible to envisage other variant ways of weaving the fiber preform of the invention.

In particular, when the blade that is to be fabricated has only one platform, extracting layers of yarns for weaving its preform takes place beside only one of the side faces of the fiber preform. This solution makes it possible to achieve greater flexibility if there are only a few layers of yarns available for weaving the platform preform.

It is also possible to make a fiber preform that presents preforms for half-platforms extending from its side faces. The half-platforms of the blade fabricated from such a preform then do not fully cover the space between two adjacent blades and it is necessary to make the missing half-platforms independently. Nevertheless, they are relatively easy to make since their weaving does not require the curvature of the airfoil to be taken into account.

In an alternative to the weaving of FIG. 3, the thickness of the airfoil of the blade to be fabricated may be varied by using weft yarns of variable weight. This alternative makes it possible to avoid extracting layers of yarns from the fiber blank and then reinserting them a little downstream.

In another alternative way of weaving the fiber blank, it is possible to double up the warp yarns constituting platform preforms and to weave them side by side so as to make them easier to extract from the fiber blank at the specific location where the platforms are to be positioned.

The invention claimed is:

1. A method of making a fiber preform for fabricating a turbine engine blade out of composite material, the blade including an airfoil extending in a longitudinal direction and presenting two opposite side faces and at least one platform extending from a side face, the method comprising:
   making a single-piece fiber blank by three-dimensional weaving with a plurality of longitudinal yarns extending in a direction corresponding to the longitudinal direction of the blade that is to be fabricated and interlinked by yarns of a plurality of transverse layers of yarns; and
   shaping the fiber blank to obtain a single-piece fiber preform including a first portion forming an airfoil preform and at least one second portion forming a platform preform,
   wherein, during the weaving of the fiber blank, yarns of a first group of longitudinal yarns are extracted from the fiber blank beside at least one of side faces of the fiber blank to form a portion of the blank corresponding to a blade platform preform, and yarns of a second group of longitudinal yarns are inserted into the fiber blank with mutual crossing between the yarns of the first group and the yarns of the second group, and
   wherein the yarns of the second group of yarns that are inserted into the fiber blank come from layers of longitudinal yarn previously extracted from the fiber blank to obtain a reduction in thickness of the blank over a width of the blank.

2. A method according to claim 1, wherein the crossing between the yarns of the first group and the yarns of the second group takes place close to a connection between the portion of the blank corresponding to the blade platform preform and the portion of the blank corresponding to the airfoil preform.

3. A method according to claim 1, wherein the shaping of the fiber blank includes cutting away portions of the yarns of the second group of yarns that are situated between zones where the yarns of the second group of yarns are extracted from and inserted into the fiber blank.

4. A method according to claim 1, wherein at least some of the yarns of the second group of yarns are extracted from the fiber blank downstream from a zone where the yarns of the second group of yarns are inserted into the fiber blank to reduce thickness of the blank over the width of the blank downstream from the portion of the blank that corresponds to the blade platform preform.

5. A method according to claim 1, wherein at least some of the yarns of the second group of yarns that are inserted into the fiber blank come from additional layers of longitudinal yarns.

6. A method according to claim 1, wherein the yarns are extracted from and inserted into the fiber blank on each of the side faces of the fiber blank to form portions of the blank that correspond to two blade platform preforms.

7. A method according to claim 1, wherein the shaping of the fiber blank includes cutting the portion of the blank that corresponds to the blade platform preform to have desired dimensions, and deploying the portion of the blank in a direction that is substantially orthogonal to a side face of the blank.

8. A method according to claim 1, wherein the longitudinal yarns extending in a direction corresponding to the longitudinal direction of the blade that is to be fabricated are warp yarns.

9. A method according to claim 1, wherein the longitudinal yarns extending in a direction corresponding to the longitudinal direction of the blade that is to be fabricated are weft yarns.

10. A fiber preform for a turbine engine blade including an airfoil extending in a longitudinal direction and presenting two opposite side faces together with at least one platform extending from a side face, the preform comprising:
    a fiber blank woven as a single piece by three-dimensional weaving with a plurality of layers of longitudinal yarns extending in a direction corresponding to the longitudinal direction of the blade that is to be fabricated and interlinked by yarns of a plurality of layers of transverse yarns,
    wherein yarns of a first group of longitudinal yarns are extracted from the fiber blank beside at least one of the side faces of the fiber blank to form a portion of the blank corresponding to a blade platform preform, and yarns of a second group of longitudinal yarns are inserted into the fiber blank, with mutual crossing between the yarns of the first group and the yarns of the second group, and
    wherein the yarns of the second group of yarns that are inserted into the fiber blank come from layers of longitudinal yarn previously extracted from the fiber blank to obtain a reduction in thickness of the blank over a width of the blank.

11. A preform according to claim 10, wherein the crossing between the yarns of the first group and the yarns of the second group takes place close to a connection between the portion of the blank that corresponds to a blade platform preform and the portion of the blank that corresponds to the airfoil preform.

12. A preform according to claim 10, wherein yarns are extracted from and inserted into the fiber blank on each of side faces of the fiber blank to form portions of the blank that correspond to two blade platform preforms.

13. A turbine engine fan blade made of composite material and comprising a fiber preform according to claim 10 densified by a matrix.

14. A turbine engine fan comprising at least one blade according to claim 13.

* * * * *